United States Patent [19]

Quinn et al.

[11] Patent Number: 5,756,967
[45] Date of Patent: May 26, 1998

[54] SENSING ARC WELDING PROCESS CHARACTERISTICS FOR WELDING PROCESS CONTROL

[75] Inventors: Timothy P. Quinn, Boulder; R. Bruce Madigan, Lyons, both of Colo.

[73] Assignee: The United States of America as represented by the Secretary of Commerce, Washington, D.C.

[21] Appl. No.: 833,765

[22] Filed: Apr. 9, 1997

[51] Int. Cl.⁶ .................................................. B23K 9/095
[52] U.S. Cl. .......................... 219/130.21; 219/130.01
[58] Field of Search .................... 219/130.21, 130.01, 219/130.31, 130.32, 130.33, 130.51, 137 PS, 137.71

[56] References Cited

U.S. PATENT DOCUMENTS

| | | | |
|---|---|---|---|
| 3,632,960 | 1/1972 | Erdmann-Jesnitzer et al. | 219/130.01 |
| 3,673,377 | 6/1972 | Erdmann-Jesnitzer et al. | 219/130.01 |
| 4,103,141 | 7/1978 | Wristen | 219/130.01 |
| 4,518,844 | 5/1985 | Needham | 219/130.21 |
| 4,595,820 | 6/1986 | Richardson | |
| 4,605,836 | 8/1986 | Retfalvi et al. | 219/130.01 |
| 4,620,082 | 10/1986 | Graville et al. | |
| 4,647,754 | 3/1987 | Hirasawa | 219/130.21 |
| 4,739,404 | 4/1988 | Richardson | |
| 4,794,232 | 12/1988 | Kimbrough et al. | |
| 4,800,131 | 1/1989 | Marshall et al. | |
| 4,825,038 | 4/1989 | Smartt et al. | |
| 4,912,299 | 3/1990 | Oros et al. | |
| 4,943,702 | 7/1990 | Richardson | |
| 4,973,822 | 11/1990 | Evans et al. | |
| 5,061,841 | 10/1991 | Richardson | |
| 5,145,318 | 9/1992 | Olson | |
| 5,157,236 | 10/1992 | Batzler et al. | |
| 5,221,825 | 6/1993 | Siewart et al. | |
| 5,315,089 | 5/1994 | Hughes et al. | |
| 5,349,156 | 9/1994 | Madigan et al. | |
| 5,521,354 | 5/1996 | Ludewig et al. | |

*Primary Examiner*—Clifford C. Shaw
*Attorney, Agent, or Firm*—Charles E. Rohrer, P.C.

[57] ABSTRACT

A method of sensing and controlling an arc welding process employs a high frequency rate of sampling of electrical signals from the welding circuit. The sampled signals are operated upon by predetermined processes to determine electrical resistance, shielding gas quality, and short circuit frequency. The process measurements are compared to a predetermined set of tolerance levels and evaluated using a window technique that updates the evaluation of the data samples at the sampling rate.

29 Claims, 9 Drawing Sheets

SENSING ARC WELDING PROCESS CHARACTERISTICS FOR WELDING PROCESS CONTROL

The present invention relates generally to sensing welding process characteristics, and more particularly to the sensing of gas-metal-arc welding process characteristics.

BACKGROUND OF THE INVENTION

Gas-metal-arc-welding (GMAW) is a process in which a consumable electrode is continuously fed into an electric arc. GMAW uses the electrical arc as the heat source for melting both the base metal to be welded and the filler metal added to the weld. An inert or slightly reactive shielding gas is used to protect the molten metal from the atmosphere. The shielding gas must have sufficient flow to displace the atmosphere from the arc as well as the weld pool until solidification occurs and the metal cools to a temperature where it does not react with the high oxygen and nitrogen levels in the atmosphere. The shielding gas also ionizes to form a high-temperature plasma that carries the current. Proper control of GMAW processes depends upon timely monitoring of the shielding gas condition.

FIG. 1 illustrates how a contact tube 1-6, an electrode 1-4, and an arc 1-7 are elements of a GMAW electrical circuit. Changes in the resistance of any of these elements affect the electrical impedance of the circuit. Metal transfer across the arc is characterized by repetitive events, each event modulating the circuit impedance in a characteristic pattern. The characterization of various droplet modes and events that interfere with stable transfer permit the voltage or current records derived from sensors 1-11 to be used to monitor arc quality.

A pulsed power source is commonly used to make welds. The signal from such a source has significant current and voltage pulses that are designed to stimulate the formation and detachment of droplets at the electrode 1-4 tip. The power source also has an internal logic circuit that changes the pulse frequency along with the wire feed rate. In U.S. Pat. No. 5,221,825, algorithms were developed to sample electrical signals from pulsed-current gas metal arc welding (PC-GMAW), evaluate those signals, and provide control action when necessary.

Constant voltage gas metal arc welding (CV-GMAW) is a high-production welding process that utilizes steady current flow. However, the current flow is sometimes affected by how the electrode is melted by the arc. If the current flow is not sufficient to melt the electrode and match the rate at which the electrode advances, then the electrode will advance into the weld pool creating a short circuit. Such an event causes the current to spike and the voltage to drop toward zero momentarily. The current can expel molten metal from the weld pool causing spatter to form. As the current flow is increased so that the melting of the filler material is maintained during the course of the weld operation, globules form on the end of the filler electrode. These globules grow until they drop off the end of the electrode. At times, however, the globules will create a short circuit. As the current is increased beyond the globular transfer mode, small droplets of weld material are formed on the end of the rod and sprayed off into the weld. The spray transfer mode has corresponding electrical signals from which weld-quality information can be obtained. Detection of short-circuiting is indicative of an improper transfer mode when the spray mode is desired. If welding is performed in the short circuit transfer mode, the frequency of the short circuits indicates whether the correct voltage or current levels are being output by the power source.

Due to differences between PC-GMAW and CV-GMAW techniques, it is necessary to employ different algorithms in order to measure similar parameters. For example: In the arc condition algorithm, the stability of the arc is evaluated by a measure of the high frequency noise during a welding process. In CV-GMAW, noise occurs in the value of the current, which necessitates inspection of the envelope of current values to obtain a measure of the stability of the arc. A measurement of resistance, which depends on both current and voltage, can provide a measure of high frequency noise as well as incorporate the dynamics of the power supply being used.

Sensing weld parameters is particularly useful for robotics welding where weld quality cannot be sensed by humans. Previous attempts to monitor welds have been based on placing a video camera close to the weld itself. However, for many production welding jobs of convoluted shapes, there is no room for a video camera. In any event, the present invention is useful for sensing potentially defective welds to mark them for later inspection.

SUMMARY OF THE INVENTION

The present invention presents solutions for detecting defects in a weld using simple non-intrusive sensors. Algorithms that determine when control of the welding process is necessary are based on a comparison of the present weld with one or more model welds which were determined to be good welds. Parameters based on the current and voltage measurements associated with the good welds are calculated at a rate T and form a baseline database with which the present weld is compared. Those parameters are calculated at a frequency equal to the inverse of the sampling rate T of the current and voltage, after which they are recorded with a time stamp measured from the start of the weld.

The parameters for PC-GMAW are average current, average voltage, average resistance, arc condition number, short circuit frequency, pulse frequency, current trend, voltage trend, and the standard deviations of the voltage, current, resistance, pulse frequency, and short circuit frequency. The parameters for CV-GMAW are average current, average voltage, average resistance, arc (gas) condition number, short circuit frequency, current trend, voltage trend, and the standard deviations of the voltage, current, resistance, and short circuit frequency. These parameters are recorded and used to analyze subsequent production welds. Thus many thresholds at regular intervals (T apart) along the weld are used instead of a single threshold for the entire weld.

Rapid sampling of electrical measurements is an important feature of the invention. However, the essence of the invention is the set of algorithms that identify defects in the welding process. These techniques, while oriented to GMAW, could also apply to other processes, such as flux core welding and tungsten inert gas welding, and submerged arc welding.

DETAILED DESCRIPTION

The present invention includes a method for determining when control action is necessary for any welding process. It also describes methods for sensing process characteristics of CV-GMAW that can be used for process control. The algorithms for measuring CV-GMAW process characteristics compliment the algorithms developed to sense and control PC-GMAW in U.S. Pat. No. 5,221,825, which is hereby incorporated by reference. Frequent assessment of weld quality allows an analysis strategy for real-time control of the weld cycle or for interruption of the weld process before an unacceptable weld is produced. The high sampling rate in combination with the processes illustrated in the flow charts of FIGS. 2–9 permit the use of a self-correcting automatic welding system.

Figure 1:
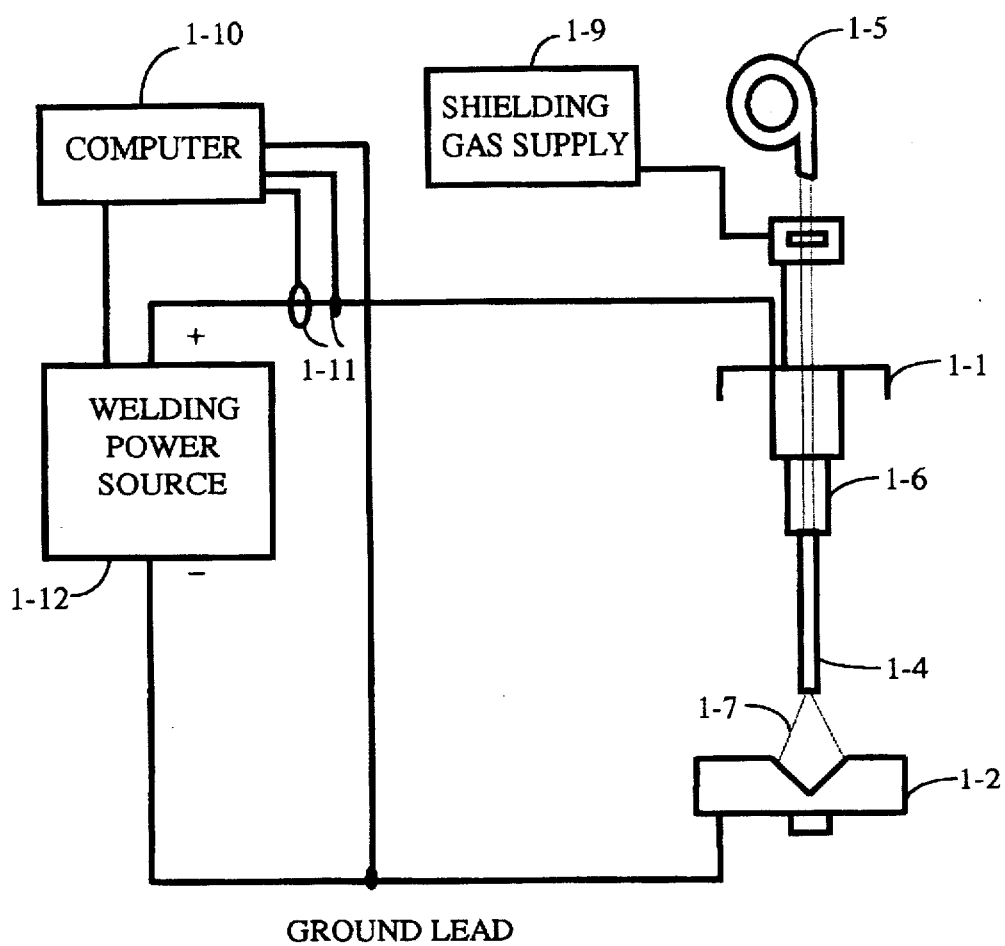
FIG. 1 illustrates the circuit arrangement used for carrying out the present invention.

FIG. 1 illustrates a circuit arrangement for carrying out the process of the present invention to weld workpieces 1–2. FIG. 1 depicts a conventional circuit and differs from conventional systems only by the manner in which samples from the sensors 1–11 are processed in computer 1–10 as illustrated in the flow charts of FIGS. 2–9. Because of the rapid weld characteristic evaluations made by computer 1–10, welding power source 1–12 can be controlled to alter the weld at arc 1-7 before the weld is irretrievably flawed. Since minor irregularities in the shielding gas supply 1-9 can be rapidly detected, the welding process can be terminated and the gas supply corrected before the expense of numerous unacceptable welds has accrued.

The sensors 1–11 can be well-known voltage taps, current sensors, or Hall-effect transducers. Welding elements 1-1, 1-4, 1-5, 1-9, and 1-12 are all conventional components described in other publications concerning this technology. Computer 1-10 can be a standard personal computer. The computer interface requires one or two analog-to-digital boards depending upon the desired features.

The sampling rate of the system is limited only by the speed that the computer 1-10 processes the sampled electrical signals according to the processes of FIGS. 2–9. It is desirable, although not necessary, to sample the current and the voltage simultaneously. For example: If 6,000 samples per second are taken using a system that has a clock frequency of 100,000 per second, the voltage and current samples may be taken on succeeding clock pulses. As a result, the samples are close in time compared to the length of time before the next current and voltage samples are taken. Consequently, the samples are taken almost simultaneously although there is a slight offset relative to the sampling period. If the sampling time between current and voltage measurements is lengthy, an interpolation technique may be used to obtain a substantially simultaneous measurement.

Figure 2:
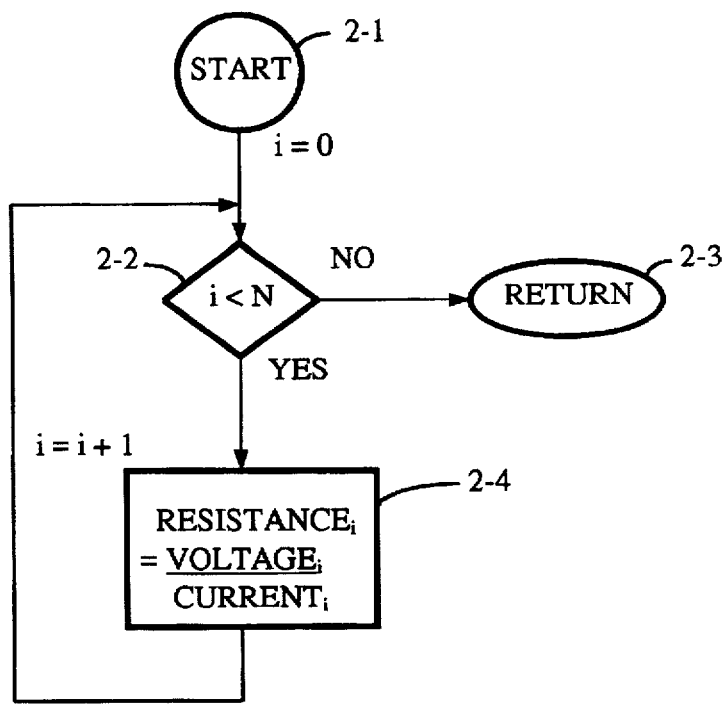
FIG. 2 is a flow chart for measuring resistance based on samples of current and voltage.

Prior to the process of FIG. 2, the current and voltage signals are sampled at a desired sampling rate, for example, 6,000 samples per second. Samples are collected until there are N samples available to process, for example, N=1,000 samples of current and 1000 samples of voltage. The N samples are used to calculate the average current and average voltage together with a standard deviation for each.

At step 2-1, the voltage and current samples are input. At step 2-2, a data array index is tested to determine if its value is less than the number N of samples in each of the groups. If not, the process is restarted at step 2-3. At step 2-4, a resistance for the sample is calculated using a voltage and current sample corresponding to the array index. The resistance of the samples is averaged to produce an average resistance for each group, and a standard deviation is then calculated for the resistance.

Figure 3:
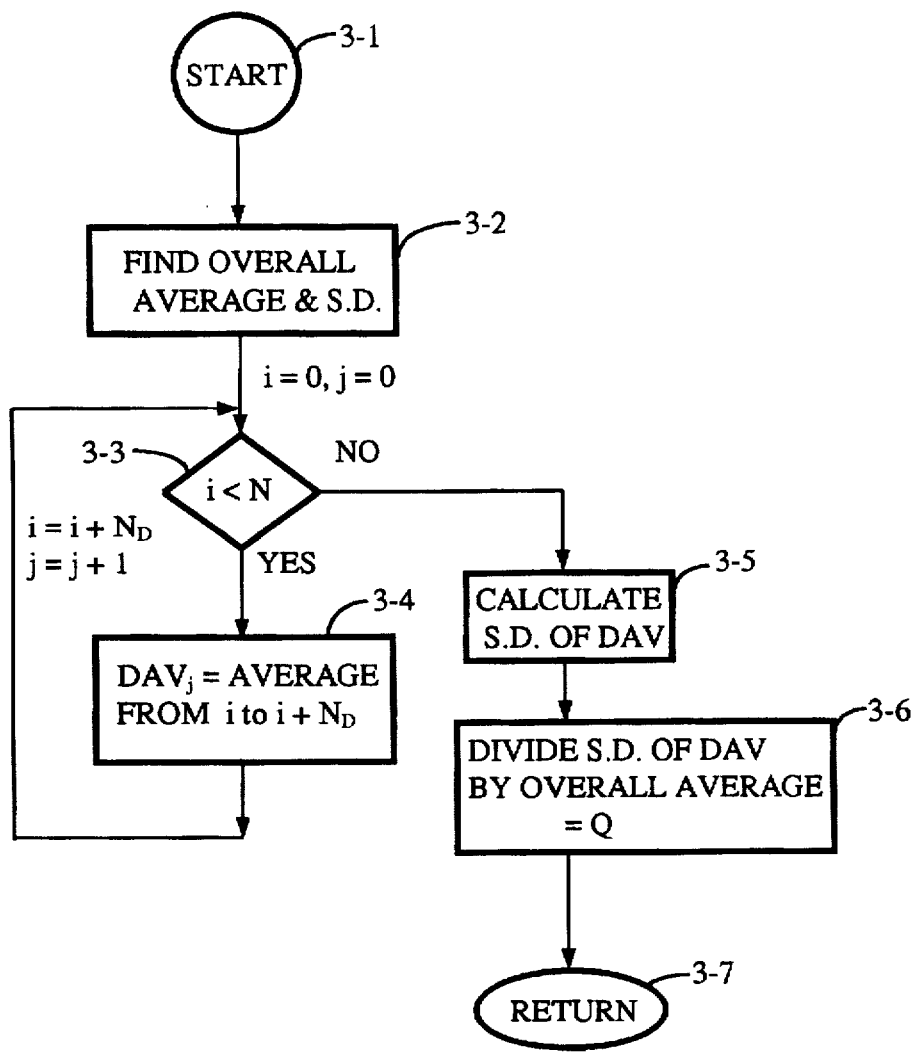
FIG. 3 is a flow chart illustrating a process for determining arc quality number and standard deviation of the arc quality number derived from values of sampled electrical signals.

FIG. 3 shows the steps for determining the arc quality number. At step 3-1, N sampled resistance or current values are input. In the preferred embodiment, the average resistance calculations are used because they incorporate both the current and the voltage measurement. In CV-GMAW, the voltage is nominally constant; however, the voltage drops when the weld goes into a short circuit condition. Consequently, the dynamics of the power supply being used are incorporated into the resistance measurement. At step 3-2, the overall average of the group of N samples is calculated along with the standard deviation. At step 3-3, a data array index is tested to determine if its value is less than the number N of samples in the group. The N samples are divided into sub-groups DAV having $N_D$ samples where, for example, $N_D$ may equal 10 samples. The data array index is incremented and step 3-4 calculates the average of the samples for each of the sub-groups DAV. When all N samples have been processed, step 3-5 calculates the standard deviation for the sub-groups DAV. At step 3-6, the standard deviation of each sub-group DAV is divided by the overall average of the group of N samples. This gives the arc quality number Q for each group of ND samples. The standard deviation of the arc quality number can be calculated at this point, if desired. At step 3-7, the succession of arc quality numbers is reviewed and any arc quality number that is out of range can be further investigated or control action initiated.

Figure 4:
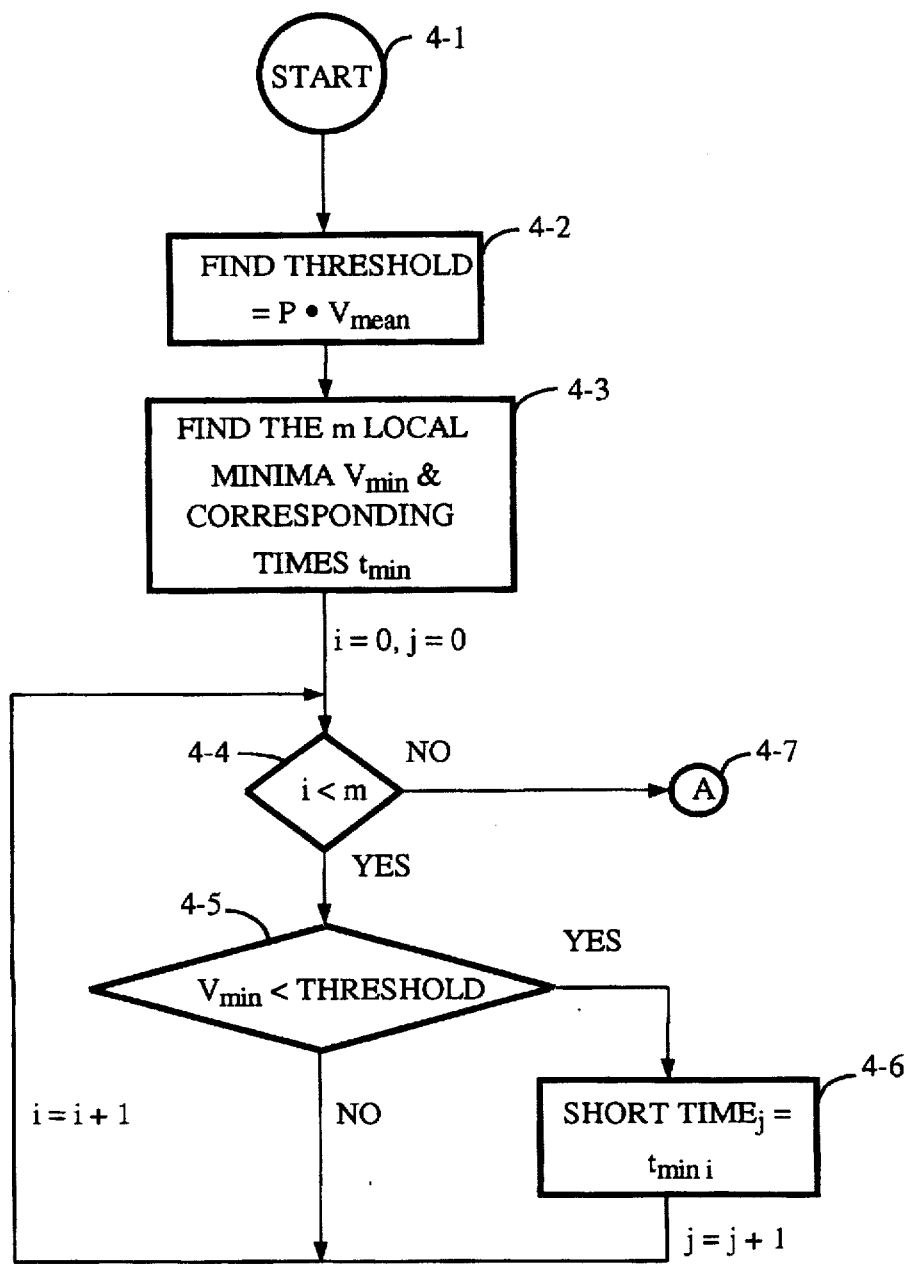
FIG. 4 is a flow chart illustrating a process for determining short circuit conditions.

The flow chart shown in FIG. 4 illustrates a method for determining the frequency of short circuit events that occur during a CV-GMAW weld. In step 4-1, N voltage signal samples sampled at a predetermined sampling frequency F, are collected. Because discreet voltage samples are being taken when a short occurs, a sample taken may indicate a voltage dropping toward zero. However, zero-voltage may not occur due to non-coincident timing between the time of the short and the sampling time. In step 4-2, a threshold $V_T$ is defined as the mean voltage in the N samples multiplied by a scaling factor P that is in the range of 0 to 1. The scaling factor P is an empirically derived constant based on observations of the weld conditions and is simply a factor utilized for indicating a short condition. The next step 4-3 finds the number m of local minima $V_{min}$ in the voltage signal and the corresponding times $t_{min}$ at which these minima $V_{min}$ occur. One method for determining local minima in a group of sampled electrical signals is disclosed in FIG. 5. The minima values $V_{min}$ and the corresponding times $t_{min}$ are stored in an indexed voltage minima array. At step 4-4, the index i of the voltage minima array is compared to the number m of local minima $V_{min}$. For each of the entries in the voltage minima array, step 4-5 compares the corresponding local minima value $V_{min}$ to the threshold value $V_T$. If the local minima $V_{min}$ is less than the threshold value $V_T$ then step 4-6 records the time $t_{min}$ of the minima as the short time with a count index j in an indexed array. The index j represents the count of the local minima $V_{min}$ below the threshold $V_T$, thus indicating a short. When the total number m of local minima $V_{min}$ have been tested, the short time array is processed at step 4-7, as shown in FIG. 6.

Figure 5:
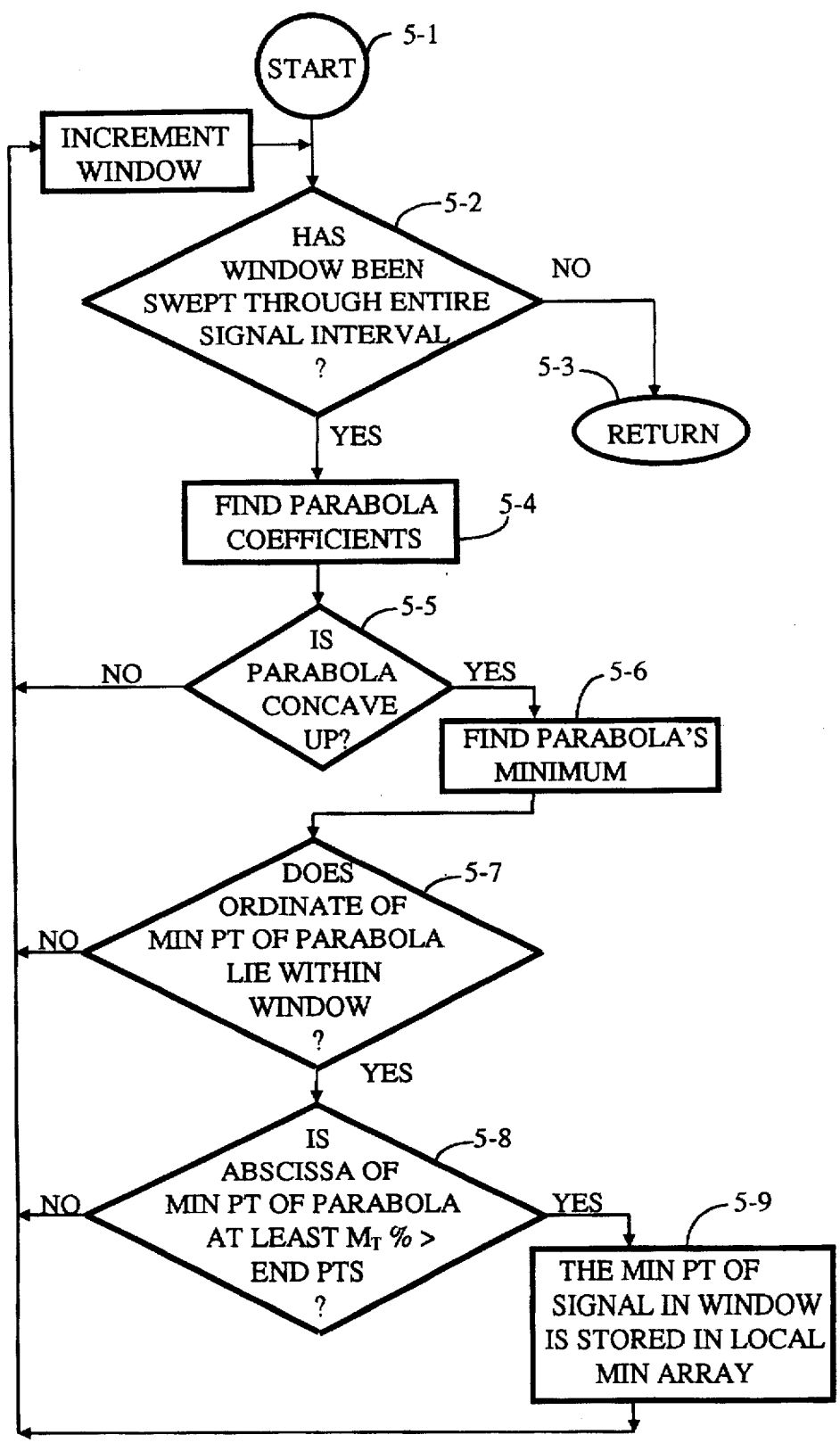
FIG. 5 is a flow chart of a process for determining local minimum values of the sampled electrical signals.

The process of FIG. 5 is used to determine the values of local minimums of the sampled electrical signal. These minimum values are applied to the process illustrated by the flow chart in FIG. 4. At step 5-1, an electrical signal is sampled. At step 5-2, a window is swept through an entire interval of the electrical signal. A parabola is fit to the signal data in the window, and the coefficients of the parabola are determined at step 5-4. Based upon the parabola coefficients, a determination is made at step 5-5 as to whether the parabola is positioned so as to be concave-up. If the parabola is concave-up, the minimum point of the parabola is found in step 5-6. A determination is then made at step 5-7 if the ordinate of the minimum point of the parabola lies within the window. At step 5-8, another determination is made whether the abscissa of the minimum point of the parabola is a predetermined percentage less than the end points of the parabola within the window. The minimum point is stored in a special array containing minimum signal values in step 5-9. These values are read from the array when required for use in the process illustrated by the flow chart in FIG. 4.

Figure 6:
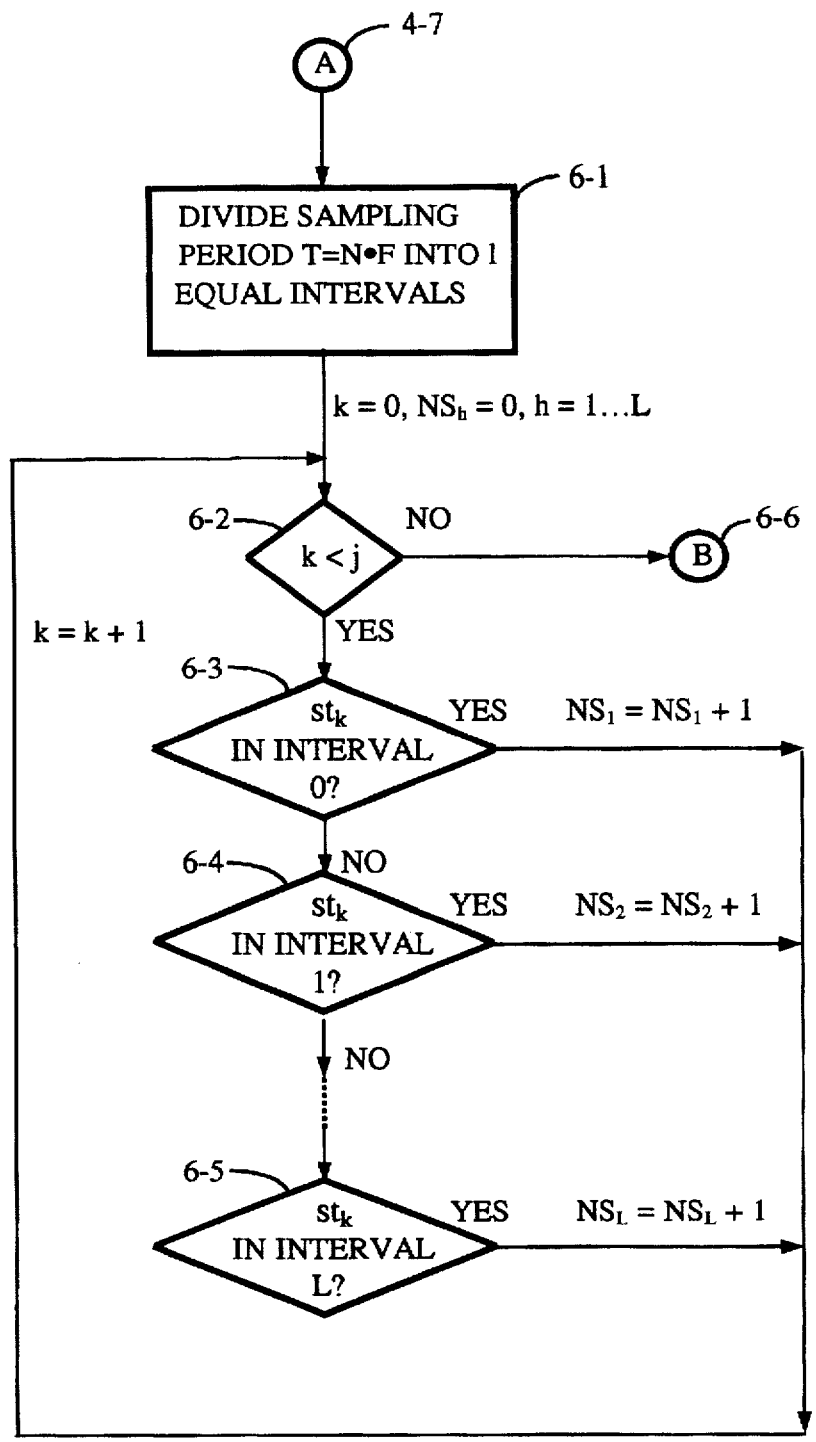
FIG. 6 is a flow chart showing a process for measuring short circuit conditions within a plurality of predefined time intervals.

FIG. 6 illustrates the short time processing of step 4-7 shown in FIG. 4. In step 6-1, the entire sampling period T of N samples is divided into a smaller number L of sub-intervals for the purpose of inspecting each of these sub-intervals for the occurrence of shorts. A number of shorts $NS_h$ is recorded for each of the L intervals. The number of shorts $NS_h$ for each sub-interval h is initialized to zero prior to counting. At step 6-2, the index k of the short time array is compared to the total number j of shorts. While the index k is less than the number j, control flows to step 6-3 to determine if the short time $st_k$ is in the first (h=1) sub-interval. If it is, the corresponding number of shorts $NS_1$ for that sub-interval h=1 is incremented. If not, control is passed to step 6-4 to determine if the short time $st_k$ is in the second (h=2) sub-interval. Likewise, the corresponding number of shorts $NS_2$ for that sub-interval h=2 is incremented. If not, then the control is passed to the next step (not shown). A successive number of steps (not shown) is implemented for determining which sub-interval h contains the short time $st_k$. up to the final step 6-5 which determines if the short time $st_k$ is in the last (h=L) sub-interval. Once all j values of the short time $st_k$ have been counted, step 6-6 calculates the short frequency and the standard deviation of the short frequency.

Figure 7:
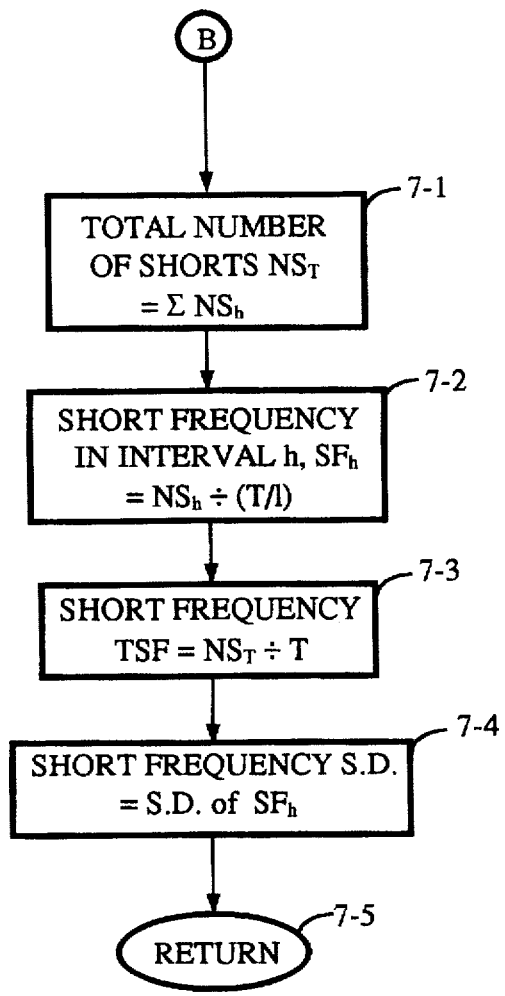
FIG. 7 is a flow chart illustrating a process for determining short circuit frequency and standard deviation of short circuit frequency.

FIG. 7 shows the details of step 6-6. Step 7-1 sums the number of shorts $NS_h$ in each sub-interval to obtain a total number of shorts $NS_T$. In step 7-2, the short frequency $SF_h$ in each interval h is calculated from the number of shorts $NS_h$ in each interval h divided by the time of a sub-interval h. The timing of sub-interval h equals the entire sampling period T divided by the number L of sub-intervals. Step 7-3 calculates the total short frequency TSF by dividing the total number of shorts NST by the processing period T. The short frequency standard deviation SFSD is calculated in step 7-4 from the standard deviation of the short frequencies $SF_h$ in each of the intervals h.

Figure 8:
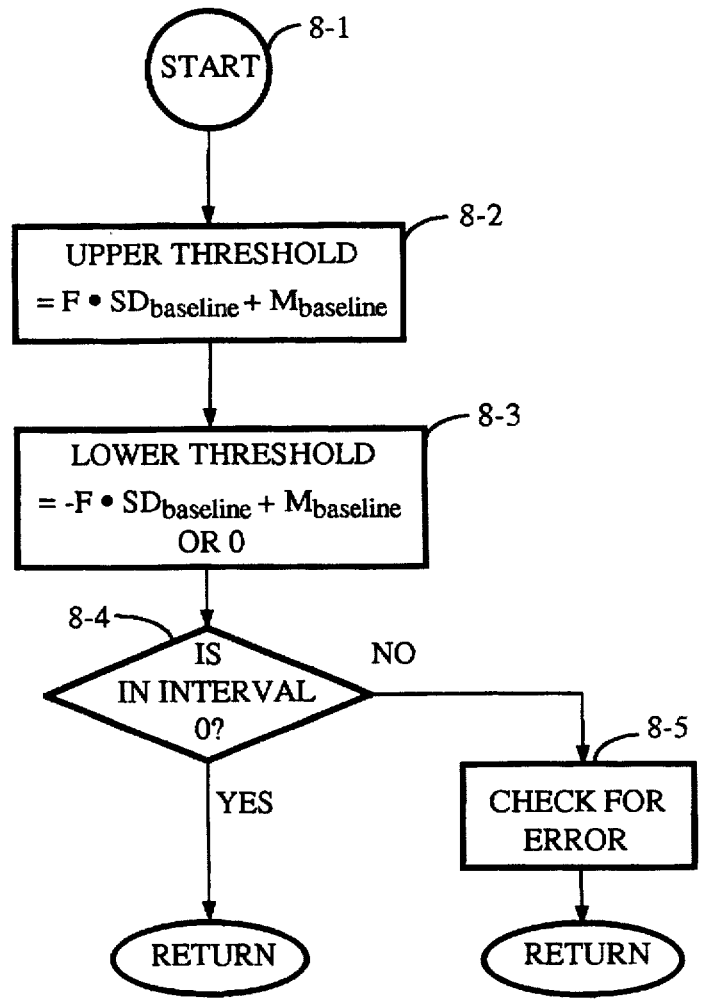
FIG. 8 is a flow chart for comparing weld process characteristics to upper and lower thresholds derived from a baseline weld.

FIG. 8 shows the technique for determining the quality of a weld. An error indication is produced by the difference of a measured parameter from a mean baseline parameter $M_{baseline}$ obtained from a known good-quality weld. If a parameter has a standard deviation associated with it, then either the average or the maximum standard deviation on the good welds is used as a baseline for error indication.

At step 8-1, a measured parameter, such as an averaged parameter taken from a plurality of measurements within a given time interval t, is input. The parameter's standard deviation may be inspected for each time interval t and an average standard deviation curve developed for the weld. Likewise, if maximum standard deviation is used in the error analysis, the maximum standard deviation of the parameter for each time interval t is provided to generate a standard deviation curve. In this manner, curves for current and the standard deviation of the current are produced. Similarly, curves for other parameters, such as the voltage, are produced.

In step 8-2, an upper threshold is determined against which the measured weld parameter is compared. The upper threshold is defined as a sum of the standard deviation $SD_{baseline}$ of the baseline parameter $M_{baseline}$ multiplied by a factor F having a value greater than zero and the mean of the baseline parameter value $M_{baseline}$. In step 8-3, a lower threshold is determined from the standard deviation $SD_{baseline}$ of the baseline parameter $M_{baseline}$ multiplied by F, which is then subtracted from the mean of the baseline parameter value $M_{baseline}$. If a parameter does not have a standard deviation associated with it, the upper threshold is determined as $M_{baseline} \bullet F_U$, where $F_U$ is some number greater than 1. If a parameter does not have a standard deviation associated with it, the lower threshold is $M_{baseline} \bullet F_L$ where $F_L$ is some fraction in $0 \leq F_L < 1$. The lower threshold has the value zero for arc quality number, short frequency, and pulse frequency for the case of PC-GMAW. At step 8-4, the measured parameter is compared to the tolerance band defined by the upper and lower thresholds established in steps 8-2 and 8-3. If the parameter is not within the tolerance band, an error checking algorithm is initiated as indicated at step 8-5.

Preferably, error checking step 8-5 analyzes each parameter separately, and indicates a bad weld when one of the parameters is out of tolerance for some significant number of measurements during the weld period. For example, a window of six data points is observed with each data point being taken at an interval of one-sixth of a second. If one data point is outside of tolerance, no error indication is made and the window is shifted one data point forward in time. The analysis is repeated, and if two data points are out of tolerance, the weld is indicated as defective. In this manner, the quality of the weld is determined six times per second.

Figure 9:
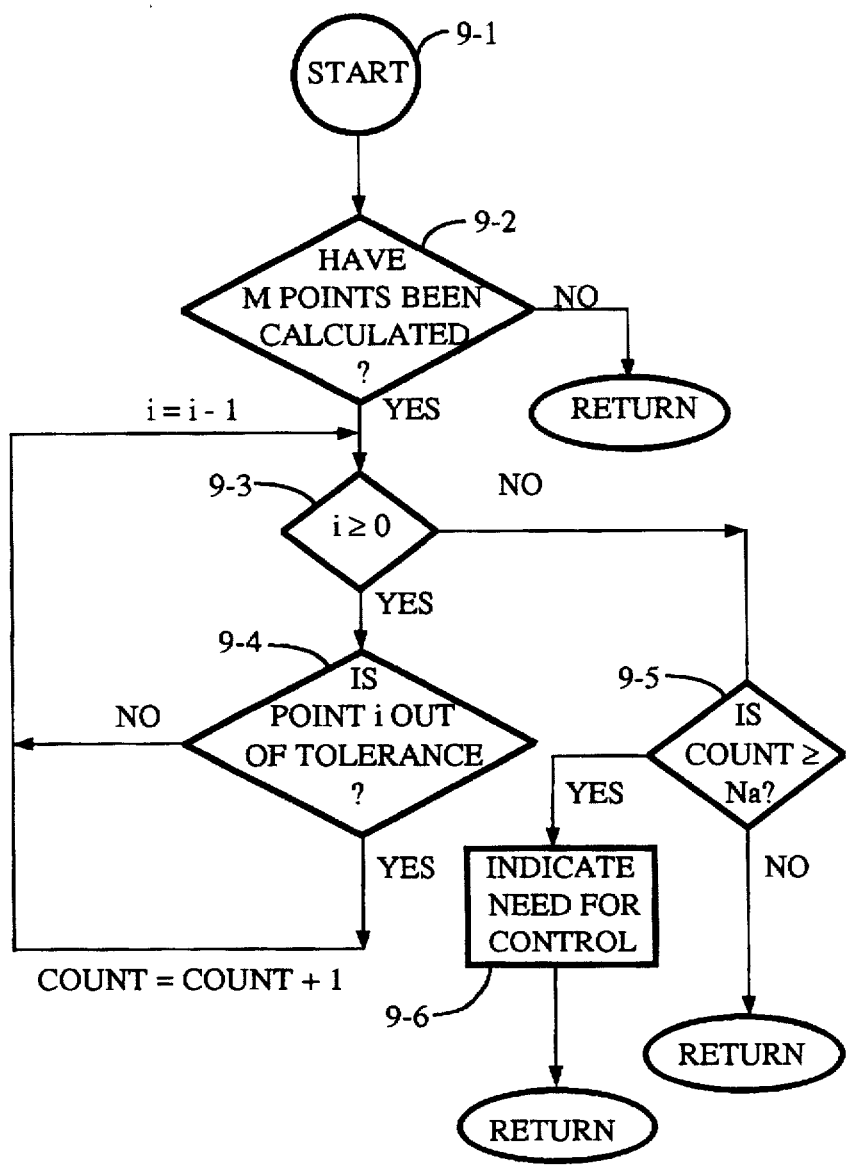
FIG. 9 is a flow chart for analyzing a window of data points to determine how many data points are out of tolerance and to decide whether process control is necessary.

The steps of the error-checking algorithm step 8-5 in FIG. 8 are described in FIG. 9. At step 9-1, a stream of calculated parameters is input. The error-checking algorithm is performed for at least one of the arc condition number, the average current, the average voltage, the short frequency, the pulse frequency, the current trend, the voltage trend, and the average resistance. Step 9-2 determines if a predetermined number M of data points has been input. This number M is a window of data points being studied, and it is incremented along the data points as new data is input. The number M is chosen based on the particular application being studied. If M data points have been calculated, a count index and a flag index i are initialized to zero. The first data point of the group of the M points passes through step 9-3 to determine if the flag index i is greater than or equal to zero. At step 9-4, the value of the data index is checked to determine if it is outside the tolerance band. If the data point is out of tolerance, the count index is incremented. For either case, the flag index i is decremented before returning to step 9-3 which transfers flow to step 9-5 5. At step 9-5, the count index is checked to determine if it is greater than or equal to a predefined number $N_a$ of acceptable error points. If so, step 9-6 indicates a need for control of the welding process. In either case, flow is returned to the first step 9-1.

For most welds, the trends in current and resistance, as well as the arc quality number are very important. For a weld operated in spray transfer mode, the number of short circuit indications provide a measurement of weld quality. For a weld operated in short circuit mode, the short frequency measurement provides an important indication of weld quality. In operations where significant time is required to make a weld, the trend in the voltage or current is important because it can indicate a slow movement toward a poor-quality weld. Many automobile manufacturers using thin sheet metal operate in the short circuit mode close to the spray mode. This type of welding is called "buried arc" and is difficult to control. However, it is important that the weld process be controlled so that these welds are made without defects. The algorithms of the present invention provide such control.

Although a number of arrangements of the invention have been mentioned by way of example, it is not intended that the invention be limited thereto. Accordingly, the invention should be considered to include any and all configurations, modifications, variations, combinations, or equivalent arrangements falling within the scope of the following claims.

What is claimed is:

1. A method of sensing and controlling a welding process carried out in a system including means for applying a weld to material to be welded, a power source to energize said means for applying a weld by forming a circuit therewith, means for sensing in-process welding characteristics, and processing means for controlling said welding process in response to sensed in-process welding characteristics, said method comprising the steps of:

providing for a tolerance band indexed by time, said tolerance band comprising a plurality of threshold values, averaged from at least one model weld, each of the threshold values derived from a plurality of sampled electrical signals or the standard deviation of the sampled electrical signals in a predetermined time slice, and each of said threshold values being indexed by a time stamp indicating a relative time from the start of the model weld;

providing for a sliding window that provides a predetermined plurality of electrical signals sampled from a weld under test, the electrical signals being indexed by a time stamp indicating a relative time from the start of the weld under test;

providing for a comparison of the electrical signals in said window to said tolerance band based on the corresponding time stamp index of the electrical signals in said window and the time stamp index of the threshold values in said tolerance band, said comparison providing an indication of error if one or more of the electrical signals is outside of said tolerance band; and providing for control action of said welding process if the indication of error meets a predetermined set of conditions.

2. The method of claim 1 wherein the step of providing for control action of the welding process comprises adjusting a wire feed device included with said means for applying a weld when the error indications in sampled voltage meets the predetermined set of conditions, and adjusting currents of said power source when the error indications in sampled current meets the predetermined set of conditions for a system using a pulsed current power source.

3. The method of claim 1 wherein the step of providing for control action of the welding process comprises adjusting a wire feed device included with said means for applying a weld when the error indications in sampled current meets the predetermined set of conditions, and adjusting the power supply voltage when the error indications in sampled current meets the predetermined set of conditions for a system using a constant voltage power source.

4. The method of claim 1 wherein said means for applying a weld carries out a gas-metal-arc welding process.

5. The method of claim 1 wherein said means for applying a weld carries out a flux core arc welding process.

6. The method of claim 1 wherein said means for applying a weld carries out a tungsten inert gas arc welding process.

7. The method of claim 1 wherein said means for applying a weld carries out a submerged arc welding process.

8. A method of sensing and controlling an electric welding process carried out in a system including means for applying a weld to material to be welded using a shielding gas, a constant voltage power source to energize said means for applying a weld by forming a circuit therewith, means for sensing in-process weld characteristics, and process means for controlling said welding process in response to sensed in-process weld characteristics indicative of short circuit occurrence, and standard deviation thereof, said method comprising the steps of:

providing for detection of a sampled electrical signal reflecting in-process weld characteristics from said circuit;

providing for identification of local minimum values of said sampled electrical signal;

providing for a determination of short circuit occurrences based upon the local minimum values of said sampled electrical signals;

providing f or a record of a plurality of short circuit frequencies by determining a number of short circuit occurrences for a plurality of predefined time intervals;

providing for a calculation of a standard deviation of the short circuit frequencies; and providing for adjustment of said power source in response to said short circuit frequency and said standard deviation.

9. The method of claim 8 wherein said means for applying a weld employs a gas metal arc welding process.

10. The method of claim 8 wherein said means for applying a weld employs a flux core arc welding process.

11. The method of claim 8 wherein said means for applying a weld carries out a tungsten inert gas arc welding process.

12. The method of claim 8 wherein said means for applying a weld carries out a submerged arc welding process.

13. The method of claim 8 wherein said local minimum values are found by the following process:

sweeping a window through an entire signal interval;

determining a parabola based upon signal data in said window and finding parabola coefficients;

determining if the parabola is upwardly concave;

determining a minimum parabola point;

determining if an ordinate of the minimum point of said parabola lies within said window;

determining if an abscissa of said minimum point of said parabola is a predetermined percentage less than end points of said parabola within said window; and storing said minimum point in a local minimum array.

14. A method of sensing and controlling an electric welding process carried out in a system including means for applying a weld to material to be welded using a shielding gas, a power source to energize said means for applying a weld by forming a circuit therewith, means for sensing in-process weld characteristics, and process means for controlling said welding process in response to sensed in-process weld characteristics indicative of a resistance, and standard deviation thereof, said method comprising the steps of:

providing for detection of a sampled electrical signal reflecting in-process weld characteristics from said circuit;

providing for calculation of said resistance derived from a current and a voltage measurement from the sampled electrical signal;

providing for calculation of said standard deviation of resistance; and providing for adjustment of said welding process in response to said resistance and said standard deviation of resistance.

15. The method of claim 14 wherein said resistance is calculated from an interpolation of at least one of the current and the voltage in order to simulate a substantially simultaneous measurement of the current and the voltage.

16. The method of claim 14 wherein said means for applying a weld employs a gas metal arc welding process.

17. The method of claim 14 wherein said means for applying a weld employs a flux core arc welding process.

18. The method of claim 14 wherein said means for applying a weld carries out a tungsten inert gas arc welding process.

19. The method of claim 14 wherein said means for applying a weld carries out a submerged arc welding process.

20. A method of sensing and controlling a welding process carried out in a system including means for applying a weld to material to be welded using a shielding gas, a power source to energize said means for applying a weld by forming a circuit therewith, means for sensing in-process weld characteristics, and process means for controlling said welding process in response to sensed in-process weld characteristics indicative of shielding gas condition, and standard deviation thereof, said method comprising the steps of:

providing for detection of a sampled electrical signal reflecting in-process weld characteristics from said circuit;

providing for calculation of an average resistance derived from a current and a voltage measurement from the sampled electrical signal, providing for determination of a mean of the average resistance;

providing for determination of a standard deviation of resistance based upon the mean of the average resistance;

providing for calculation of said shielding gas condition based upon said average resistance and said standard deviation of resistance;

providing for comparison of said shielding gas condition to predetermined thresholds to determine if said weld process requires control action; and providing for adjustment of said welding process in response to said comparison.

21. The method of claim 20 wherein said means for applying a weld employs a gas metal arc welding process.

22. The method of claim 20 wherein said means for applying a weld employs a flux core arc welding process.

23. The method of claim 20 wherein said means for applying a weld carries out a tungsten inert gas arc welding process.

24. The method of claim 20 wherein said means for applying a weld carries out a submerged arc welding process.

25. A method of sensing and controlling a welding process carried out in a system including means for applying a weld to material to be welded using a shielding gas, a constant voltage power source to energize said means for applying a weld by forming a circuit therewith, means for sensing in-process weld characteristics, and process means for controlling said welding process in response to sensed in-process weld characteristics indicative of shielding gas condition, and standard deviation thereof, said method comprising the steps of:

providing for detection of a sampled electrical signal reflecting in-process weld characteristics from said circuit;

providing for determination of an average voltage derived from the sampled electrical signal;

providing for determination of a mean of the average voltage;

providing for determination of a standard deviation of voltage based upon the mean of the average voltage;

providing for calculation of said shielding gas condition based upon said average voltage and said standard deviation of voltage;

providing for comparison of said shielding gas condition to predetermined thresholds to determine if said weld process requires control action; and providing for adjustment of said welding process in response to said comparison.

26. The method of claim 25 wherein said means for applying a weld employs a gas metal arc welding process.

27. The method of claim 25 wherein said means for applying a weld employs a flux core arc welding process.

28. The method of claim 25 wherein said means for applying a weld carries out a tungsten inert gas arc welding process.

29. The method of claim 25 wherein said means for applying a weld carries out a submerged arc welding process.

* * * * *